United States Patent
Jong

(10) Patent No.: US 9,636,949 B2
(45) Date of Patent: May 2, 2017

(54) VEHICLE AXLE ASSEMBLIES FOR CHANGING WHEEL TRACKS FOR MOVING SMALL ELECTRIC VEHICLES

(71) Applicant: Chiou-muh Jong, Ellicott City, MD (US)

(72) Inventor: Chiou-muh Jong, Ellicott City, MD (US)

( * ) Notice: Subject to any disclaimer, the term of this patent is extended or adjusted under 35 U.S.C. 154(b) by 0 days.

(21) Appl. No.: 14/919,678

(22) Filed: Oct. 21, 2015

(65) Prior Publication Data

US 2017/0080751 A1    Mar. 23, 2017

Related U.S. Application Data

(63) Continuation of application No. 14/859,359, filed on Sep. 21, 2015.

(51) Int. Cl.
| | | |
|---|---|---|
| *B60B 35/12* | (2006.01) | |
| *B60B 35/10* | (2006.01) | |
| *F16H 25/20* | (2006.01) | |
| *F16C 3/03* | (2006.01) | |
| *B60L 11/18* | (2006.01) | |

(52) U.S. Cl.
CPC .......... *B60B 35/1036* (2013.01); *B60B 35/12* (2013.01); *F16C 3/03* (2013.01); *F16H 25/20* (2013.01); *B60B 2320/10* (2013.01); *B60B 2900/3312* (2013.01); *B60B 2900/351* (2013.01); *B60L 11/18* (2013.01)

(58) Field of Classification Search
CPC ............ B60B 35/12; F16C 3/03; F16H 25/20
See application file for complete search history.

(56) References Cited

U.S. PATENT DOCUMENTS

| | | | |
|---|---|---|---|
| 3,820,497 A * | 6/1974 | Konijn ................. | B60F 3/0007 180/7.1 |
| 4,395,191 A * | 7/1983 | Kaiser ................... | E02F 9/085 180/7.1 |
| 7,780,197 B2 | 8/2010 | White | |
| 8,205,892 B2 * | 6/2012 | Mackin ............... | B60B 35/1054 180/209 |
| 8,746,388 B2 * | 6/2014 | Budweil ............ | B60B 35/1063 180/209 |

FOREIGN PATENT DOCUMENTS

EP     1908674 A1     4/2008

* cited by examiner

*Primary Examiner* — John Walters
*Assistant Examiner* — James Triggs

(57) ABSTRACT

A coaxial multi-member mechanism for using as the front axle and the rear axle in an electric vehicle is presented to allow the wheels of the vehicle changing the track widths from a wide track to a narrow track or vice versa in vehicle moving condition. The wide track mode is for safer high speed driving and more collision protection from the four wheels. The narrow track is used on the other hand for narrow street and slow speed driving and for easy parking in a narrow space.

5 Claims, 2 Drawing Sheets

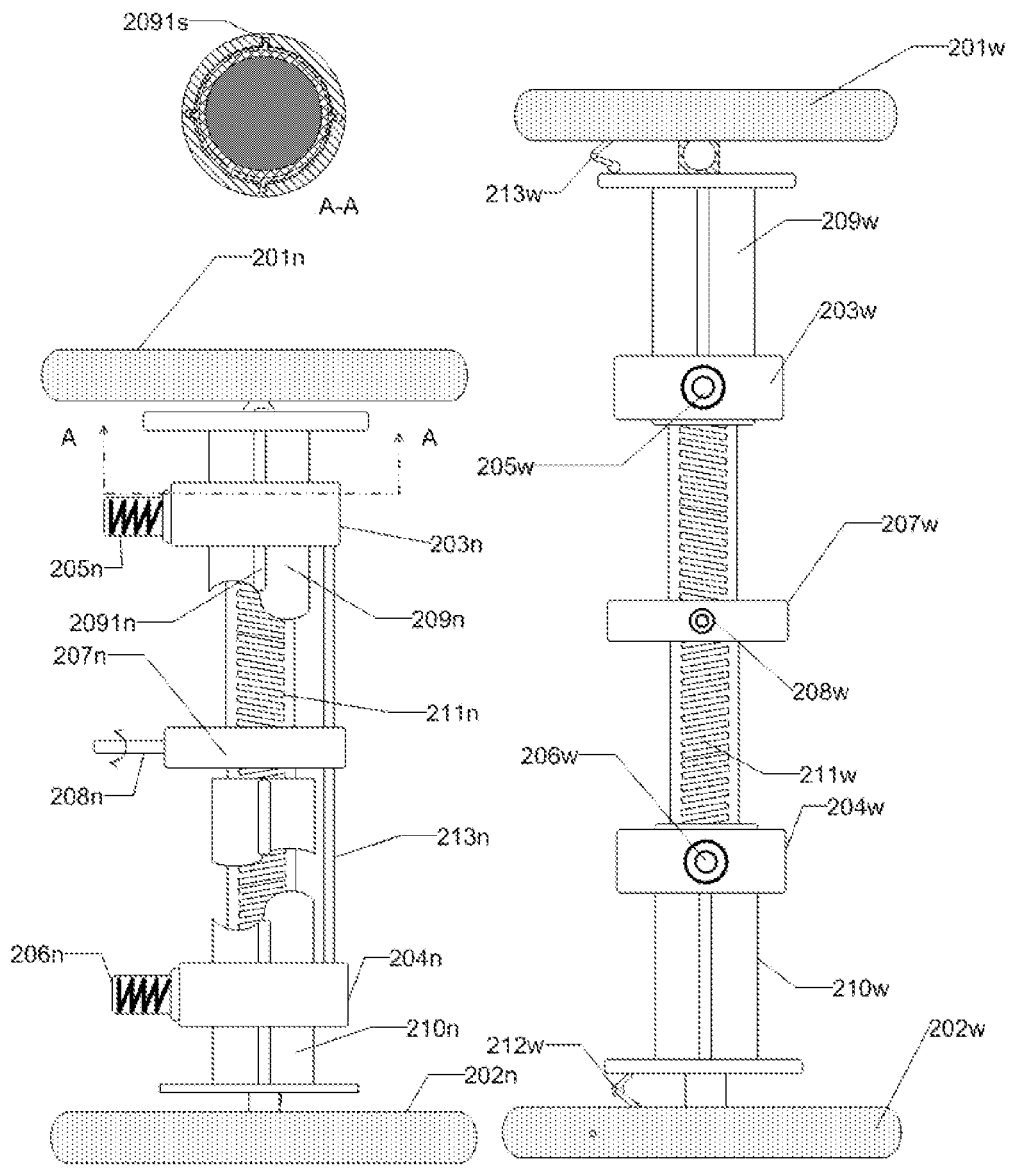

VEHICLE AXLE ASSEMBLIES FOR CHANGING WHEEL TRACKS FOR MOVING SMALL ELECTRIC VEHICLES

CROSS-REFERENCES TO RELATED APPLICATIONS

This application is a continuation-in-part of application Ser. No. 14/859,309 filed Sep. 20, 2015 and application Ser. No. 14/326,060, filed on Jul. 8, 2014 now abandoned.

BACKGROUND OF THE INVENTION

A small vehicle powered by electricity from batteries or other means offers the solution to city traffic congestion and pollution problem. In fact, very high percentages of vehicles driving on the highway or city streets, especially in the United States, have no more than two occupants. This means that these low occupied vehicles moving on the streets can be replaced by two seat smaller vehicles to lower fuel consumption and lower the pollution level. However, small vehicles typically are not safe to drive on the streets where a lot of big trucks, big SUVs and regular size sedans are also sharing. To make small vehicles safer to drive on the streets, special design for collision prevention should be implemented up to a level that the general public can accept before we see small two seat vehicles widely show up on the streets.

For example, a U.S. patent application US20070164583 presents a design in which vehicle body can be expanded to a bigger size for collision protection during highway driving and shrink back to small size for narrow street driving. The drawback of this design is that, while the vehicle body can be expanded bigger to provide more cushion, the collision protection may not strong enough and it is difficult to make the shell of the vehicle looks appealing.

U.S. Pat. No. 7,780,197 presented a way to extend the front wheels and rear wheels by using telescoping tube structure. The drawbacks of this design is that it still uses a single steering mechanism with rods connecting to both front wheels, thus the complex nature of the mechanism for a heavy farm tractor will be difficult to maintain the rigidity of the structure. The tube axle will also have difficulty to bear the load of the heavy tractor because when it expands outward, the portion left in the frame tube will be very limited because the frame tube needs to contain left and right hand axle tubes, particularly for the rear axle due to the existence of the differential gear. It is easy to see that such expandable axle design is not possible for a small vehicle having a very narrow track such as 42" to begin with.

European patent application EP1908674A1 further disclosed a design using hydraulic cylinders to achieve the expansion and retraction of the four wheels of a vehicle.

On U.S. Pat. No. 8,205,892 Mackin et al. disclosed a method to use toe-in and toe-out of wheels rolling on ground as driving forces to change hydraulic equipped vehicle axles for changing the track width of a vehicle.

However, changing vehicle wheel tracks is not only difficult to design, given that normal commercial vehicles typically have rack and pinion mechanism for steering function and transmission axles coupled with differential gear assemblies for rear or front axle to deliver power, there is no good reason to have such capability for most of them because they already have wheel tracks wide enough to occupy major portion of the lanes in most highways anywhere. Small cars, on the opposite, can use such capability to make it safer and more stable to drive because there is room to expand the wheel tracks for being small.

Considering that most high speed race cars have a design that typically having a small chassis supported by four wheels which span much wider track width than the width of the chassis, it offers a clue to make a smaller car very stable to drive in high speed and at the mean time it also offers some protection for the chassis from the wider track of four wheels, as well as passengers inside the cars. This idea is particularly useful for developing a small electric vehicle which does not need as much electric power as a traditional vehicles having capacity of four or five passengers. Therefore, it is intuitively true that a design for a small vehicle seating two persons in tandem which is capable of changing its track width to a narrow track for narrow street driving and wide track width for high speed driving would be an ideal small electric car in the near future. A similar design for such purpose is shown, for example, in U.S. Pat. No. 8,746,388. The major disadvantages of design in the above mentioned patent is that it widens the track of front wheels only, not front and rear wheels at the same time and is thus not able to provide as much collision protection and stability as desired. Another disadvantage is that the mechanism to support the track width change, combined with originally equipped suspension and steering mechanism, becomes very complicated and the rigidness of such structure could face big challenge during high speed driving in addition to questionable durability problem.

Electric cars using batteries or fuel cells are gradually considered as a way to solve pollution problem in urban area. However, battery power is still very expensive in terms of reasonable driving range between recharges for a normal five seat sedan. To make electric popular among all drivers, smaller cars with enough collision protection is the way to go; daily commute to work does not need a full sized car.

The purpose of current invention is to provide a coaxial multi-member mechanism for using as both front and rear axles in an small electric vehicle such that its four wheels can expand to a wide wheel track if it is to be driven with high speed on the highway for safer and more stable condition; and retract to narrow wheel track as a small car to tour in narrow streets.

Further more, the intended application of the invention is for electric cars with no emission, small size of such vehicles makes them particularly easy to solve parking problem—they don't need to park in conventional parking space. They can even be driven into elevator and parked in the lobby area of a big building, provided that the building is equipped with elevator big enough to carry the vehicles to all levels in the building, thus relieve a lot of city parking problems.

BRIEF SUMMARY OF THE INVENTION

A vehicle with two pairs of wheels associated with a front axle and a rear axle constructed as coaxial multi-member mechanism respectively, capable of changing track width during moderate moving speed is disclosed. A control means and an actuator can be used to expand or narrow down the track width to predetermined maximum or minimum widths for different driving environment.

Maximum track width condition offers extra collision protection to the chassis and passengers. It also provides additional driving stability by changing wider track width, as normally the cases in Formula 1 racing cars. Minimum track offers the agility for driving in small lanes with speed limits lower than, say, 50 miles per hour or so.

The car is preferably a small one with electric power and two seats in tandem. Such car consume less power, consequently is the solution to most environmental issues and urban congestion problems exist especially in big cities around the world.

It is therefore a primary object of current invention to provide an expandable and retractable axle mechanism for a small two seat vehicle, electric power preferably, to be able to safely drive on the highways along with other bigger vehicles.

Another object of the present invention is to provide a small vehicle built with coaxial multi-member mechanisms as front and rear axles which can be driven to narrow downtown alleys with easiness and smaller parking space.

Another object of the present invention is to promote popularity of small electric power cars while the battery capacity is still too expensive for regular automobiles.

Still another object of the present invention is to make the small electric cars popular for big urban areas where the traffic condition and air quality do not allow more regular automobiles with traditional gas power engines.

Yet another object of the present invention is to provide a more affordable, more economical way to commute for most drivers of single occupant vehicles.

A further object for the present invention is to provide small vehicles which relieve the parking problems for shopping centers.

Theses and other objects of the present invention will become clearer to those skilled in the art as the description proceeds.

BRIEF DESCRIPTION OF SEVERAL VIEWS OF THE DRAWING

FIG. 2A and FIG. 2B show the detailed structure of the coaxial multi-member mechanism to be used for an electric vehicle to achieve the function of expanding wheel track as in FIG. 2B and retracting wheel track as in FIG. 2A during driving condition. In particular, FIG. 2A shows the side view of the mechanism while FIG. 2B shows top view of the same mechanism.

DETAILED DESCRIPTION OF THE INVENTION

Figure 1A:
FIG. 1A and FIG. 1B show the same vehicle in maximum and minimum track width respectively.
Figure 1B:
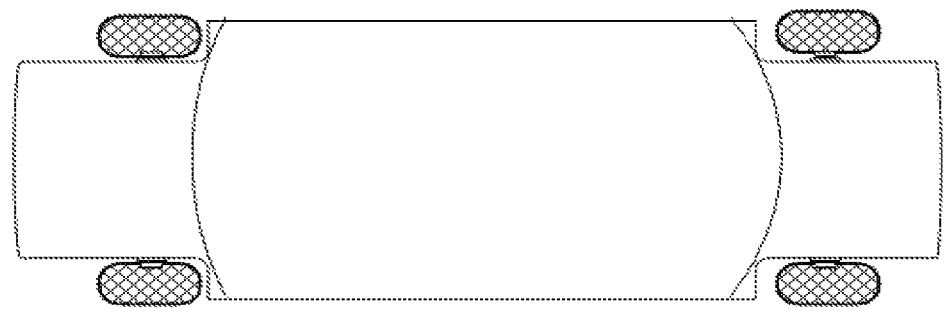

FIG. 1A and FIG. 1B show the two operation modes of a vehicle according to the invention. Wide track mode as shown in FIG. 1A is used for vehicle traveling at high speed, typically higher then 50 miles per hour. FIG. 1B, on the other hand, shows the narrow track mode intended for traveling at low speed as typically in small streets, alleys and lane where normal sedans are not easy to get around and where chassis protection is not as crucial as high speed driving on highway.

The implementation of current invention is to design a low energy consumption small vehicle, particularly an electric power one, which can expand its four wheels to a wider track width, consequently occupy bigger strip of the road than the width of its unchanged chassis in order to avoid the chassis being directly collided when it is driven on interstate highway along with many other much bigger vehicles at speed higher than 60 miles per hour. An ideal design will be to have a wide track width wider than 60". 60" to 68", for example, is the roughly about the range of wheel tracks of compact and medium size vehicles traveling on the highway. Taking 64" as the targeted wide track width (vehicle overall width about 72"), a narrow track width to match would be 44" if a 10" expansion/retraction is considered, and 48" is about the overall width of most golf carts which seat two people in parallel and have wheel track around 38". However, considering the vehicle implemented under current invention is to travel at speed much higher than golf carts even at narrow track mode, the narrow track width should be a little wider, say, at least 40" is more appropriate. Such vehicle would be best designed in style of tandem seating for two persons such that each of them will have plenty of space to operate the vehicle or seating behind doing other things. In such proposed design, the track width will expand 10" each side for a total width expansion of 20", which will significantly increase ability to prevent the vehicle from tip over in addition to be able to avoid the chassis being collided by other vehicles.

In conventional vehicles, a rack and pinion assembly driven by the steering wheel, mostly assisted by hydraulic system, is used to connect and steer the front wheels. Such assembly makes the design of a front axle-wheel assembly capable of dynamically changing track width a difficult, if not impossible thing to consider. Similarly, the need of a differential gear box at the center of rear axle also makes the idea of changing track width for a rear axle-wheel assembly run into similar degree of difficulty. By contrast, current inventions eliminates the need for a rigid connecting rod by using motor driven linkages to each of the two front wheels and control both motors by wires. Such arrangement makes the designing task of front axle-wheel assembly capable of dynamic movements of inward and outward in driving condition much easier to do. Similarly, design task is easier for rear axle-wheel assembly to render inward and outward movements by using motor wheels to replace differential gearbox.

FIG. 2 shows the detailed structure of current invention, FIG. 2A shows the coaxial multi-member mechanism in retracted mode, while FIG. 2B in expanded mode. To make these two drawings easier to compare, the character n is used to designate a component at narrow track condition and w for wide track condition for the same component.

The three cylinder-like members of the coaxial multi-member mechanism refer to part 209, 210 and 211 shown in FIGS. 2(A & B). The gearbox 207 which can undergo clockwise and counter-clockwise rotation by the motor driven shaft 208 is used to drive the rotation of cylinder 211. The rotation of driving rod 211, as designed to have opposite threads on its outer surface, will push cylinder 209 and 210 simultaneously outward or pull them simultaneously inward, depends on the direction of rotation. In this way, a push button can be installed in the vehicle to control motor driven shaft 208 in order to push or pull the wheels 201 and 202 attached to the ends of 209 and 210. Of course, such operation will be possible only when the vehicle is moving, and preferably not in fast moving condition.

In order to expand and retract front and rear wheels simultaneously, the coaxial multi-member mechanism should be used as front and rear axles. The difference is, we know at least one, either front or rear axle with wheels should power to drive the vehicle, so either of them can use motor wheels to directly get power from battery without the use of transmission axle and differential gear. The function of differential gear for adjusting relative rotation speed of inner wheel to outer wheel can easily be achieved by the motor speed control. From mechanical standpoint, electric vehicle is much easier to design and this might be one the reasons that the legend German sports car company Porsche had electric car before any of their powerful sports car models.

To allow relative motion and secure the axles to the vehicle frame, two cylindrical components 203 and 204 are used to hold the two flanged cylinders 209 and 210 respectively. To allow only relative axial motion between 209 and 203 and similarly between 210 and 204, at least a component-long cog (tooth) 2091 is used to prevent rotational motion between them. 203 and 204 further equipped with suspension shock absorber 205 and 206 respectively to securely connect to the vehicle frame so that the vehicle can be supported by the two axles. A strong connecting member such as 213 is used to hold 203, 204 and gearbox 207 together as fixed structure, which are further fixed relative to the vehicle through the suspensions on 203 and 204. Section drawing A-A further shows that four long cogs like 2091 are used to prevent relative motion between 203 and 209.

The ends of the flanged cylinders for front and rear axle will be a little different in structure beyond the flanges. For using as front axle, which typically has additional structure for allowing steering for front wheels, the structure beyond flange can extend to have a ball joint so that front wheel will be allow to turn when subjected to the motor driven mechanism 213 to allow wire steering of the vehicle—the steering wheel send turning signal to the motor in 213 directly to conduct direction turning function without using traditional mechanism rack and pinion assembly and connecting rod. For rear axle, it can be just an extended portion insert into center of motor wheel.

For a designing vehicle targeted to have overall width of 72" when the wheels expand to wide track, the track width will be about 64". Using this value and 10" as expansion or retraction stroke as design basis for the vehicle axles, then narrow track width is 44" and thus the longest possible length for the driving rod, considering a space is needed in between wheel and flange of the flanged cylinder for operating motor driven steering linkage, will be 40". Of this 40 inch length, 2" is needed for a gear in the gearbox to drive the driving rod and 38" will be covered with thread, 19" at each half with threads in opposite directions, with each flanged also having a length of 19". When the wheels expanded to wide track, flanged cylinder will move out 10" and thus leaves 9" adequately engaged with driving rod to support the vehicle. If we reduce the expansion stroke to 9", 10" engagement will be even more for maintaining the structure in secure at wide track condition. To the end, an optimization design consideration will be needed to come out with best combination of stroke length, wide track and narrow track width and overall vehicle width at wide track and at narrow track for a secure vehicle structure.

The embodiments presented above are typical embodiments of current invention. Various modifications can be made without departing from the scope of the invention, which is defined by the attached claims. For example, one of the axles can use coaxial hydraulic cylinder for pushing outward and pulling inward to the wheels. The vehicle may also be a three wheeler and use only one set of coaxial multi-member mechanism disclosed in current invention.

I claim:

1. A coaxial multi-member mechanism for using as the front axle and the rear axle in an electric vehicle comprising:
   a driving rod with clockwise thread on the first half of the surface and counter-clockwise thread on the second half of the surface,
   a first flanged cylinder having a flange at one end connecting to a wheel assembly, having clockwise thread on the inner surface matching the thread pattern on the first half of said driving rod and having a plural of member-wise long cog on the outer surface,
   a second flanged cylinder having a flange at one end connecting to a wheel assembly, having counter-clockwise thread on the inner surface matching the thread pattern on the second half of said driving rod and having a plural of member-wise long cog on the outer surface,
   a first cylindrical member with inner surface structure matching the outer surface of said first flanged cylinder for preventing relative rotation while allowing relative axial motion,
   a second cylindrical member with inner surface structure matching the outer surface of said second flanged cylinder for preventing relative rotation while allowing relative axial motion,
   a motor driven gearbox for clockwise or counter-clockwise rotating said driving rod and
   a connecting member to connect said first cylindrical member, said second cylindrical member and said motor driven gearbox for securely fixed to the frame of the electric vehicle, whereby controlling the rotation of the motor driven gearbox on the front axle and the motor driven gearbox on the rear axle simultaneously in one direction pushing the wheels of the electric vehicle outward to a predetermined wide wheel track and the rotation in another direction simultaneously pulls the wheels of the electric vehicle inward to a predetermined narrow wheel track.

2. The coaxial multi-member mechanism according to claim 1, wherein each of said first cylindrical member and said second cylindrical member further comprising a shock absorber securely connecting to vehicle frame for supporting vehicle weight.

3. The coaxial multi-member mechanism according to claim 1, wherein the rotation of said driving rod in one direction pushes said first flanged cylinder and said second flanged cylinder to move outward simultaneously while the rotation in another direction pulls said first flanged cylinder and said second flanged cylinder to move inward simultaneously.

4. The coaxial multi-member mechanism according to claim 1, wherein the rotation of said motor driven gearbox is controlled by a control means in the electric vehicle for expanding or retracting wheel tracks in driving condition.

5. A method for building a coaxial multi-member mechanism for using as the front axle and the rear axle in an electric vehicle comprising the steps of:
   providing a driving rod with clockwise thread on the first half of the surface and counter-clockwise thread on the second half of the surface,
   installing onto the first half of said driving rod a first flanged cylinder having a flange at one end connecting to a wheel assembly, having clockwise thread on the inner surface matching the thread pattern on the surface of first half of said driving rod and having a plural of member-wise long cog on the outer surface,
   installing onto the second half of said driving rod a second flanged cylinder having a flange at one end connecting to a wheel assembly, having counter-clockwise thread on the inner surface matching the thread pattern on the surface of second half of said driving rod and having a plural of member-wise long cog on the outer surface,
   installing onto said first flanged cylinder a first cylindrical member with inner surface structure matching the outer surface of said first flanged cylinder for preventing relative rotation while allowing relative axial motion, providing a shock absorber securely connecting said first cylindrical member and the frame of the electric vehicle, installing onto said second flanged cylinder a second cylindrical member with inner surface structure matching the outer surface of said second flanged cylinder for preventing relative rotation while allowing relative axial motion, providing a shock absorber securely connecting said second cylindrical member and the frame of the electric vehicle, installing a motor driven gearbox for clockwise or counter-clockwise rotating said driving rod and installing a connecting member to connect said first cylindrical member, said second cylindrical member and said motor driven gearbox for securely fixed to the frame of the electric vehicle, whereby controlling the rotation of the motor driven gearbox on the front axle and the motor driven gearbox on the rear axle simultaneously in one direction pushing the wheels of the electric vehicle outward to a predetermined wide wheel track and the rotation in another direction simultaneously pulls the wheels of the electric vehicle inward to a predetermined narrow wheel track.

* * * * *